United States Patent [19]
Kvale

[11] Patent Number: 4,868,993
[45] Date of Patent: Sep. 26, 1989

[54] BICYCLE FRAME ALIGNMENT TOOL

[76] Inventor: Christopher W. Kvale, 2520 33rd Ave. S., Minneapolis, Minn. 55406

[21] Appl. No.: 240,430

[22] Filed: Sep. 1, 1988

Related U.S. Application Data

[60] Continuation of Ser. No. 20,143, Feb. 25, 1987, abandoned, which is a continuation-in-part of Ser. No. 876,996, Jun. 18, 1986, abandoned.

[51] Int. Cl.⁴ ................................................ G01B 5/25
[52] U.S. Cl. ........................................ 33/608; 33/286; 33/533; 33/203.19; 33/645
[58] Field of Search ...................... 33/286, 288, 203.19, 33/203.17, 533, 600, 608, 613, 645

[56] References Cited

U.S. PATENT DOCUMENTS

| | | | |
|---|---|---|---|
| 1,240,528 | 9/1917 | Alsworth | 33/203.19 |
| 4,096,636 | 6/1978 | Little | 33/180 AT |
| 4,432,144 | 2/1984 | Carlsson | 33/180 AT |
| 4,506,447 | 3/1985 | Lob | 33/180 AT |
| 4,594,787 | 6/1986 | Nagano | 33/180 AT |

OTHER PUBLICATIONS

Park Tool Co. catalog, p. 7 (no date).
New England Cycling Academy (NECA) catalog, 1986, pp. 1–5.
"The NECA Frame Alignment Systems", Rich Carlson, *Bike Tech Newsletter,* vol. 5, No. 3, Fall 1986 (title page and pp. 5–9).

*Primary Examiner*—Harry N. Haroian
*Attorney, Agent, or Firm*—Merchant, Gould, Smith, Edell, Welter & Schmidt

[57] ABSTRACT

A tool for checking the alignment of bicycle frames includes threaded sleeves for threading into the bottom bracket shell of the bicycle frame, and a gauge bar adapted to be held in contact with the sleeve. The sleeve and the gauge bar have precisely machined engagement surfaces so that when assembled and clamped together, for example by a vise, the gauge bar is held precisely perpendicular to the central movement, i.e., bottom bracket, of the bicycle frame, with the gauge bar positioned to extend along the down tube or seat tube of the bicycle frame so that any deviations thereof from perpendicularity with the central movement can be measured.

10 Claims, 7 Drawing Sheets

BICYCLE FRAME ALIGNMENT TOOL

This is a continuation of application Ser. No. 020,143, filed Feb. 25, 1987. which was a continuation-in-part of Ser. No. 876,996, filed June 18, 1986 both now abandoned.

FIELD OF THE INVENTION

This invention pertains generally to the field of manufacturing and repairing high quality bicycles, and in particular to an improved frame alignment tool which permits rapid and highly accurate measurements of bicycle frame alignment.

BACKGROUND OF THE INVENTION

It has long been recognized that in the building of high quality bicycles, especially those used for competition, the frame must be accurately aligned. Specifically, the center lines of the main triangle of the frame, consisting of the top tube, seat tube and down tube, must describe a plane which coincides with the plane of the wheels (with the front wheel directed straight ahead) and the central movement, i.e., bottom bracket, must be precisely perpendicular to that plane. Bicycles which are not so aligned may present problems in handling and stability, and if the bottom bracket is not perpendicular to the plane of the main frame triangle, there may occur problems in the drive train and the derailleur system, and there may occur problems in the ability and ease with which the rider can pedal the bicycle.

The need for accurately checking the alignment of the bicycle frame occurs at numerous instances during the building of the frame, and also may occur in connection with later rebuilding or repair of the frame. During frame building, the down tube and seat tube must be joined to the bottom bracket shell, usually by a brazing process. The use of a jig to hold the bottom bracket shell, seat tube, and down tube during brazing will not ensure proper alignment, due to differential rate of expansion and distortion resulting from the application of heat. It is therefore necessary, as a practical matter, to check and recheck alignment at various steps throughout the building process to ensure accurate results.

In the prior art, almost all systems or tools for measuring any deviation of the seat tube and down tube from the perpendicular to the central movement rely on the faces, i.e., outermost edges, of the bottom bracket shell, to establish a line or plane which is then compared to that of the seat tube or down tube. In practice, the problem with this method is that the faces of the bottom bracket shell may not be exactly parallel to one another or perpendicular to the axis of the central movement. This situation can often result from imprecise or worn tools used to mill the faces of the bottom bracket shell. Since the distance between the two points on the bottom bracket faces which establish the reference line in such systems is only about 40mm, any small variances in the faces from one side of the bottom bracket shell to the other can result in large discrepancies when extended as references all the way along the seat tube or down tube. Obviously, it becomes impossible to accurately measure alignment under such circumstances.

Others have proposed the use of an alignment tool which relies on sleeves threaded into the bottom bracket shell and having a central bore into which a pin or rod is inserted, with a reference bar attached at right angles to the pin or rod. While theoretically overcoming the problem of non-parallel bottom bracket faces mentioned above, such systems in practice are subject to inacurracies caused by machining tolerances for the pin and bore or wear therein through use, with the result that the frame alignment reference provided by said tools is also subject to errors. Other systems have been proposed which use a combination of engagement of the bottom bracket faces and a bore in a sleeve threaded into the bottom bracket, but it is believed that such systems are subject to the same errors and inaccuracies as those discussed above.

SUMMARY OF THE INVENTION

To overcome these and other problems, the present invention provdies an improved bicycle frame alignment tool which provides a reference against which the down tube and seat tube may be measured which is perpendicular to the central movement, i.e., the bottom bracket spindle, which is independent of the faces of the bottom bracket shell, and which relies for its accuracy on highly accurate machined engagement surfaces and not only on the positioning of a pin in a bore and its attendant tolerance and wear problems.

The tool according to the present invention includes threaded sleeve means for threading into the bottom bracket shell, with the sleeve means having at least one, and preferably two, outer faces with engagement surfaces machined therein perpendicular to the axis of threading of the sleeve and the bottom bracket shell. An elongate gauge member is included having at least one highly accurate machined engagement surface thereon, and having a reference surface extending therealong for measurements of bicycle frame tube position. The gauge member and the sleeve means have connecting means, which in the preferred embodiment takes the form of a mating pin and a bore, respectively, for permitting assembly of the gauge member and sleeve means while the sleeve means is threadably received in the bottom bracket shell and the gauge member is positioned alongside the bicycle frame, with the engagement surface of the gauge member and one engagement surface of the sleeve means abutting one another to define the relative alignment thereof. In this manner, the reference surface of the gauge member is held perpendicularly to the threading axis of the bottom bracket shell, and may therefore be used as a reference for measurements of any deviation of a tube of the bicycle frame from a plane perpendicular to the central movement.

According to a preferred embodiment of the invention, an engagement member is provided having a pin for fitting in the sleeve means on the opposite side thereof from the gauge member, and having an engagement surface contacting the engagement surface on said other side of said sleeve means, whereby the engagement member and the gauge member can be held by a vise or the like, with the bottom bracket shell being isolated from contact with the vise or other holding means.

DETAILED DESCRIPTION OF THE PREFERRED EMBODIMENT

Figure 1:
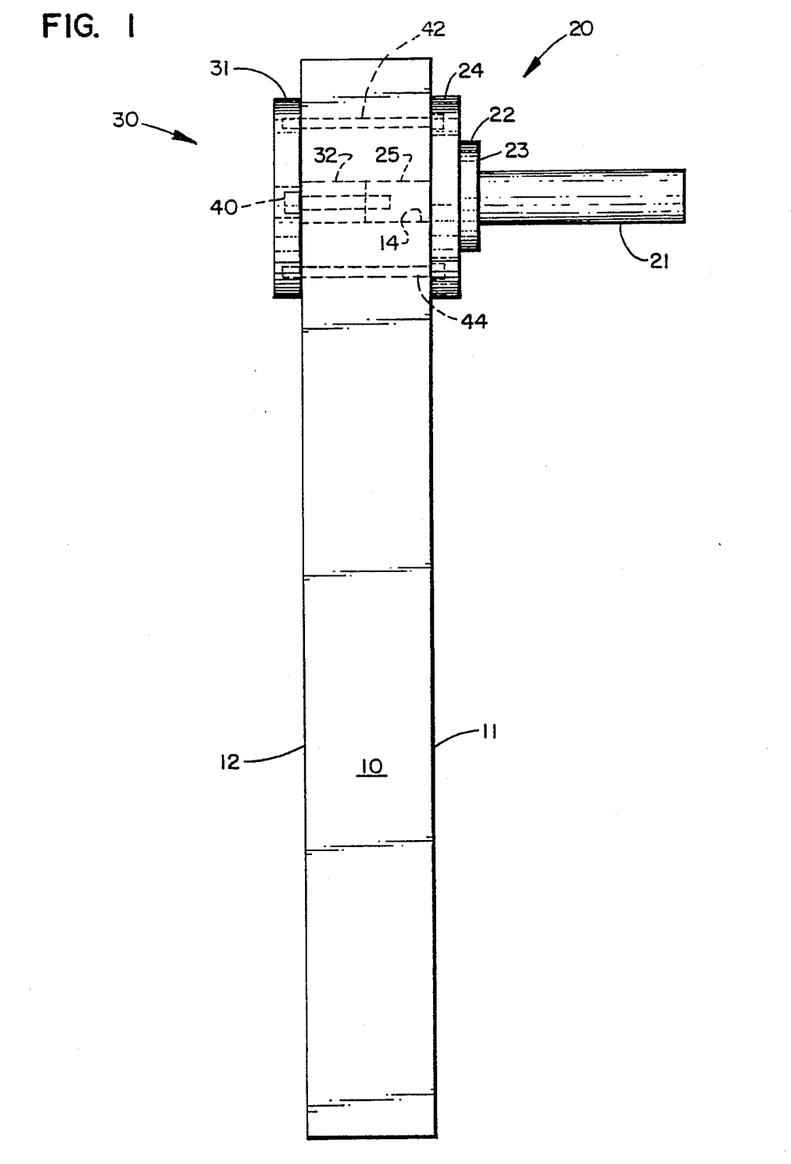
FIG. 1 is a side view of the bicycle frame alignment tool according to the present invention.

Bar 10 is an elongate square or rectangularly sectioned bar which serves as the gauge member for the alignment tool. Bar 10 is milled so that sides 11 and 12 are precisely parallel to one another. Bar 10 is preferably made of aluminum or aluminum alloy to reduce the weight of the tool and increase its ease of handling. However, steel or other material can be used if it can be machined to the required tolerances.

Bar 10 has a bore 14 extending through the bar from face 11 to face 12, generally adjacent one end of the bar. A pair of members 20 and 30 are secured to bar 10 adjacent that end.

Figure 4:
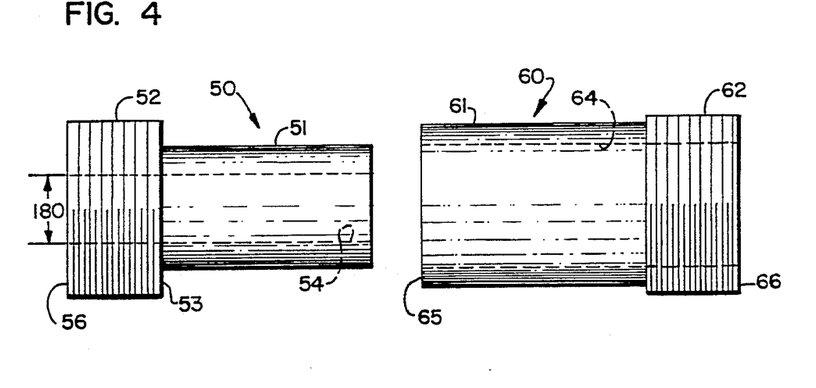
FIG. 4 is a view of bottom bracket sleeves for use with the tool of FIG. 1.

Member 20 is preferably made of hardened, D-2, or other very hard steel in order to maximize wear. Member 20 in the preferred embodiment is a single piece of steel in which four different circular sections are machined by turning. The first section is pin-like section indicated by reference number 21. The diameter of pin section 21 must be precisely controlled. In the preferred embodiment, a diameter of exactly 18.0 mm is used, although a different diameter can be used so long as it is compatible with the sleeves of FIG. 4. The length of pin section 21 is approximately 60 mm. Section 22 has a larger diameter than section 21, preferably between about 29.5 mm and 32.0mm. It should be small enough to fit within the bottom bracket shell without interference and large enough to provide adequate engagement with the sleeve (FIG. 4). Section 22 thus forms a collar about the base of pin section 21. The face of this collar is indicated by reference number 23, and is machined to be precisely perpendicular to the axis of section 21. Surface 23 is used as a reference and engagement surface in the use of the invention.

The next section is section 24, and this is another disk-like or collar-like section having a larger diameter than collar 22. The back side of section 24, which will be in contact with face 11 of bar 12, is machined to be perpendicular ot the axis of pin section 21. The fourth section of number 20 is indicated by reference number 25, and this is a pin having a diameter to fit within bore 14 of bar 10.

Member 30 is also preferably made of the same material as member 20, and it is a single piece machined into two sections by turning. The outer section is indicated by reference number 31, and this is approximately the same diameter as section 24. The inner section is indicated by reference number 32, and this is of the same diameter as section 25, so as to fit snugly and securely within bore 14. The back side of section 31 is machined flat and perpendicular to section 32 so as to contact face 12 of bar 10.

Figure 2:
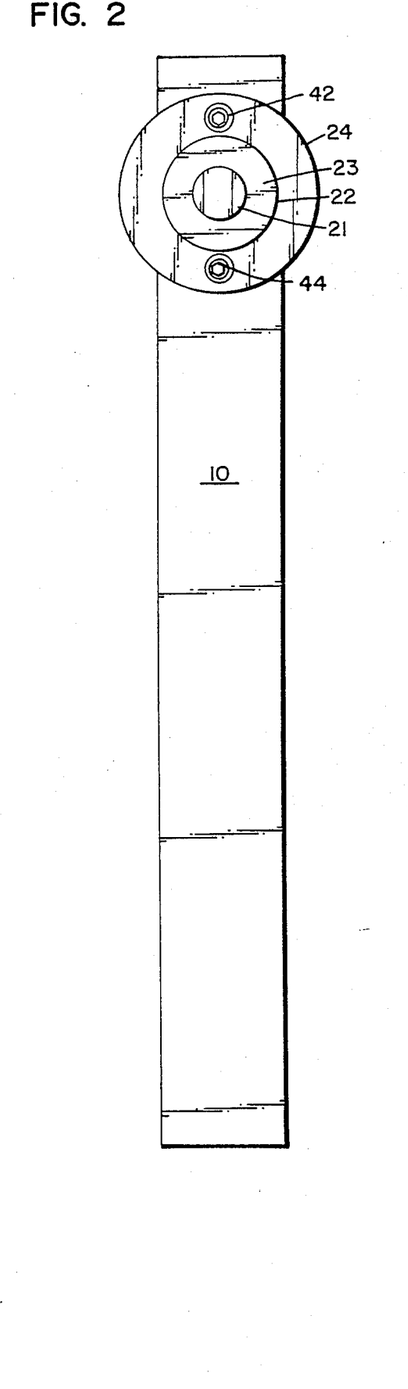
FIG. 2 is a top view of the tool of FIG. 1.
Figure 3:
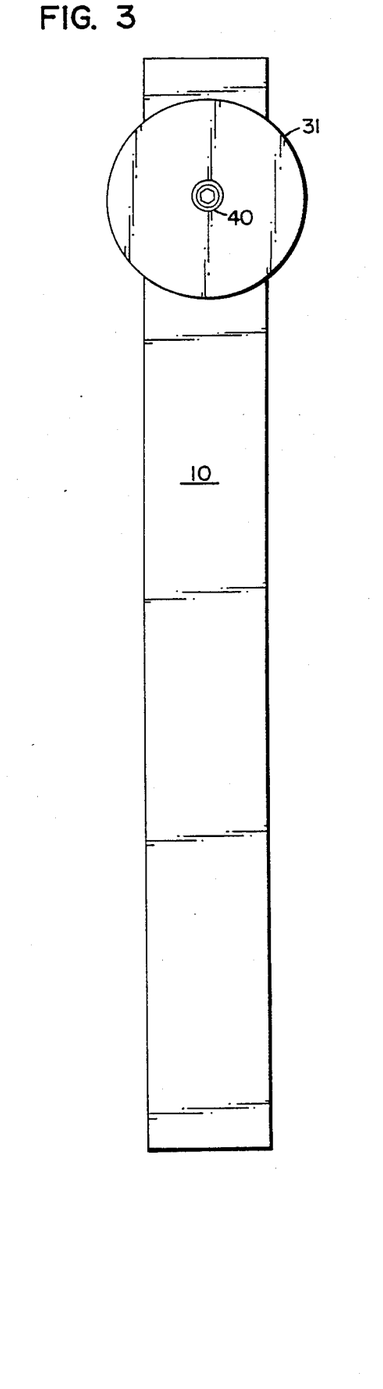
FIG. 3 is a bottom view of the tool of FIG. 1.

Members 20 and 30 are assembled together with bar 10 by press fitting pin sections 25 and 32 into bore 14, and the assembly is further secured by means of three bolts. Bolt 40 extends from a recess in member 30, through the central axis of section 32, and into a tapped hole in section 25 of member 20. A pair of bolts 42 and 44 extend from recesses provided in section 24 of member 20, through holes in bar 10 and into tapped holes in section 31 of member 30. The axis of section 21 is precisely perpendicular to machined surface 23 and surfaces 11 and 12 of bar 10.

In FIG. 4, reference number 50 designates the inner bottom bracket sleeve, and reference number 60 designates the outer bottom bracket sleeve. For convenience, sleeves 50 and 60 can be bottom bracket sleeves made by Campagnolo and known as tools 724/1 and 724/2, respectively. However, higher accuracy can be achieved in the use of this tool by specially making these parts rather than using the Compagnolo parts. Sleeve 50 has an inner cylindrical section 51 and a threaded outer section 52. It also has a central bore 54 which, in the case of the Campagnolo tool, is 18.0 mm and is designed to accept the shaft of a bottom bracket facing tool. The threading of section 52 is of course to match one of the various national standards for bottom bracket threading. Sleeve 60 has an inner cylindrical section 61 and an outer threaded cylindrical section 62. The threading of section 62 is also to match the threading of the bottom bracket shell. Section 60 has a central bore 64 which is sized according to the outer diameter of section 51, so as to receive it. In use, sleeves 50 and 60 are threaded into the bottom bracket and mate together until face 53 of sleeve 50 abuts face 65 of sleeve 60.

The outer face 56 of sleeve 50 and the outer face 66 of sleeve 60 are used as reference and engagement surfaces for purposes of this invention. It is essential that faces 56, 53, 65 and 66 be precisely perpendicular to the bore 54 and to the axis of threading of sections 52 and 62, i.e., the threading axis of the bottom bracket. The precision of faces 53 and 65, and also of faces 56 and 66 in the above-mentioned standard bottom bracket tool used for bottom bracket facing may not be accurate enough for optimum use of this invention. It is therefore necessary if standard bottom bracket sleeves are to be used that they be machined or remachined at faces 56, 53, 65 and 66. Alternatively, special parts can be machined with the required high degree of precision. In this case the diameter of pin section 21 and bore 54 can be made to any chosen dimension.

In use, sleeves 50, 60 are screwed tightly into the bottom bracket shell of the bicycle until abutment surfaces 53 and 65 contact each other. Pin section 21 of the alignment tool is then inserted in bore 54. The bar can be used on either side of the bottom bracket shell. Pin section 21 is inserted far enough that engagement surface 23 of collar 22 engages surface 56 of sleeve 50, in the case of one side of the bicycle frame, or engages surface 66 of sleeve 60, in the case of use on the opposite side of the bicycle frame.

Figure 5:
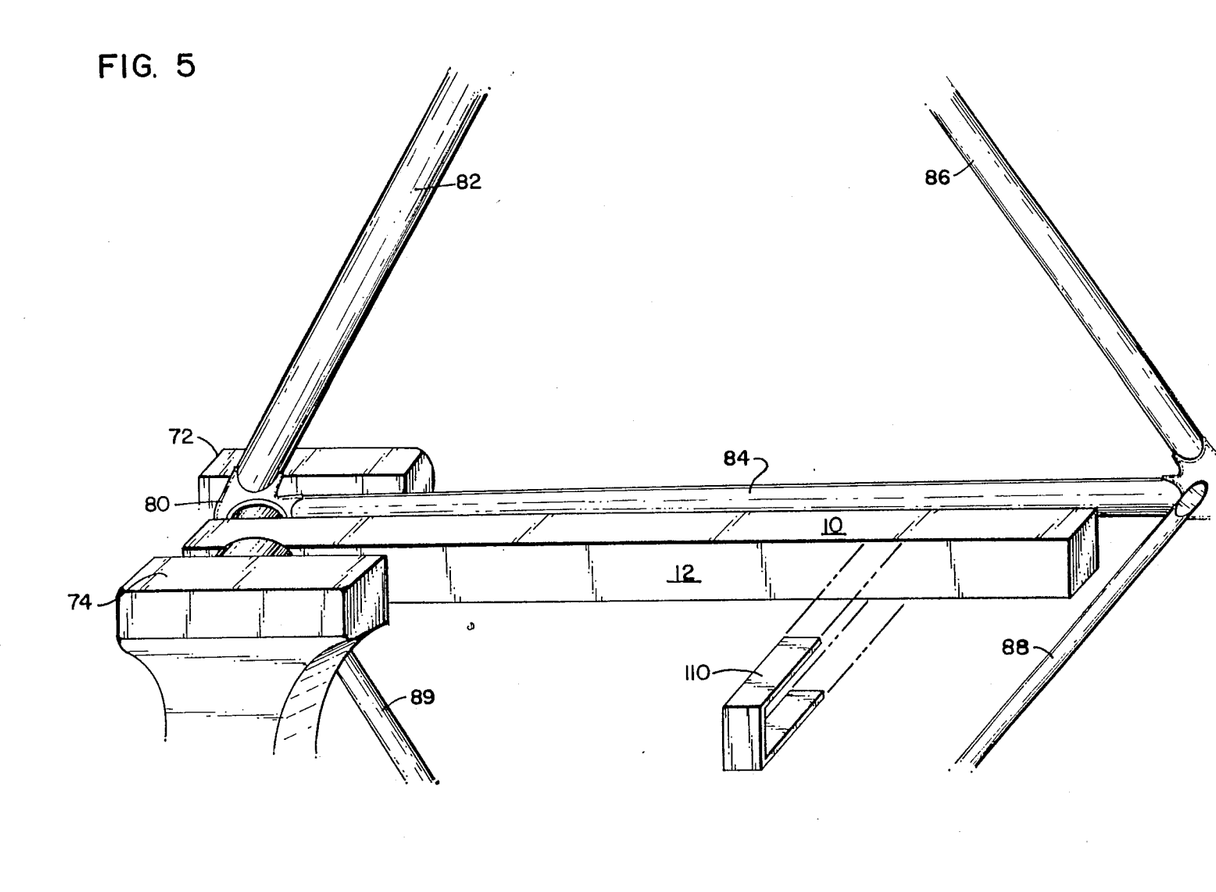
FIG. 5 is a view showing the tool in use with a portion of a bicycle frame, the apparatus being held in a vise.
Figure 6:
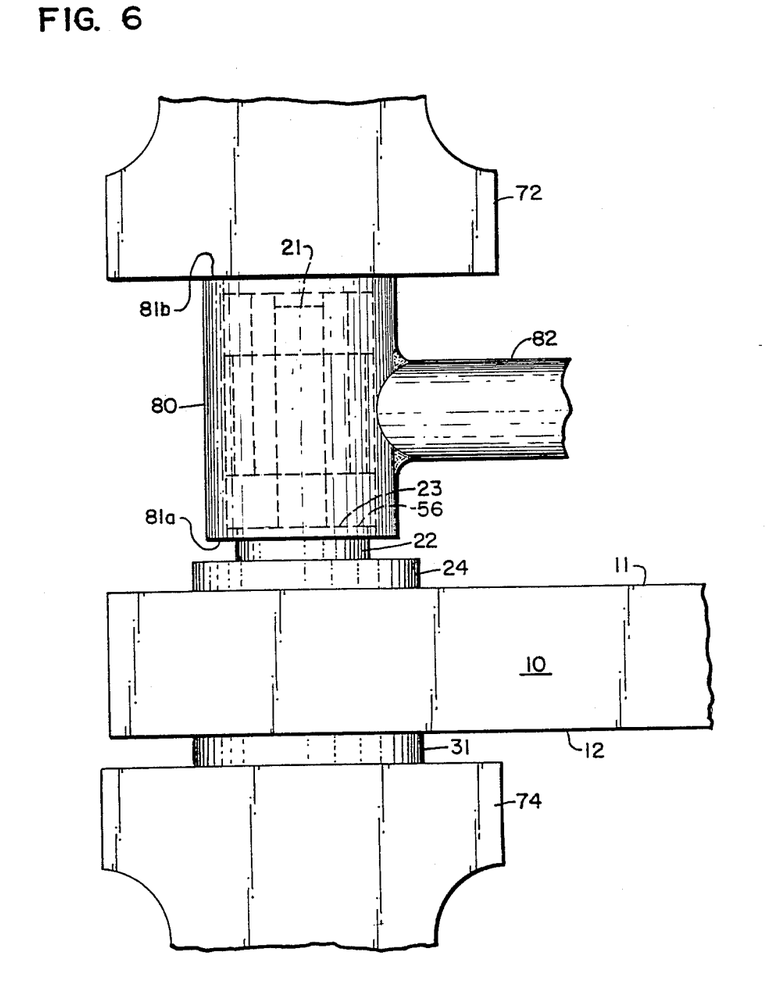
FIG. 6 is an enlarged fragmentary view of the tool in use as in FIG. 5, at an enlarged scale.

In FIGS. 5 and 6, the tool is assembled into a bicycle frame, and the entire assembly is held between the jaws of a vise 72, 74. The bicycle frame includes bottom bracket 80, down tube 82, seat tube 84, top tube 86, seat stays 88 and chain stays 89. It will be seen that the positioning of the tool and particularly bar 10 is controlled not only by the fit of pin section 21 in the central bore 54 of sleeve 50, but more importantly by the abutment of engagement surface 23 of the tool and engagement surface 56 of the sleeve (or surface 66 if the tool is mounted on the opposite side of the bottom bracket). The vise is adjusted to clamp these reference surfaces into engagement and hold the frame and tool. Machined reference surfaces 11, 12 of bar 10 are now held perfectly perpendicular to the central movement of the bicycle frame, without reference to the faces 81a, 81b of bottom bracket shell 80. This is important because, as was pointed out above, these faces in practice may not be perpendicular to the axis of the central movement of the bicycle. While the frame and tool are held in the vise, the user has both hands free for measuring alignment or other activities. With the tool thus in place, any deviation of seat tube 84 from perpendicularity with the central movement can easily be gauged by noting distances from bar 10 along the tube. If there are deviations, corrective action can be taken by cold setting the frame into alignment, after which alignment should be checked again. For best results, the tool should be inserted in the other side of the bottom bracket to double-check. By loosening the jaws of the vise, bar 10 can be rotated through an arc to bring it into alignment with down tube 82, then the vise is tightened, and alignment of the down tube can be checked in the same manner.

It is important that the fit of pin section 21 into the bottom bracket sleeve not be used as the sole reference for perpendicularity, as these parts are subject to tolerance errors (they must be made loose enough to allow fitting together) and they are subject to wear over the life of the tool as the parts are assembled, disassembled, and rotated. In contrast, engagement surface 23 and surfaces 56, 66 can be made to a high degree of precision, as no tolerance is required for fit, and they are not subject to significant wear, as in the case of the pin. Thus, precise alignment is achieved and will be maintained over a very long useful life of the tool.

Figure 7:
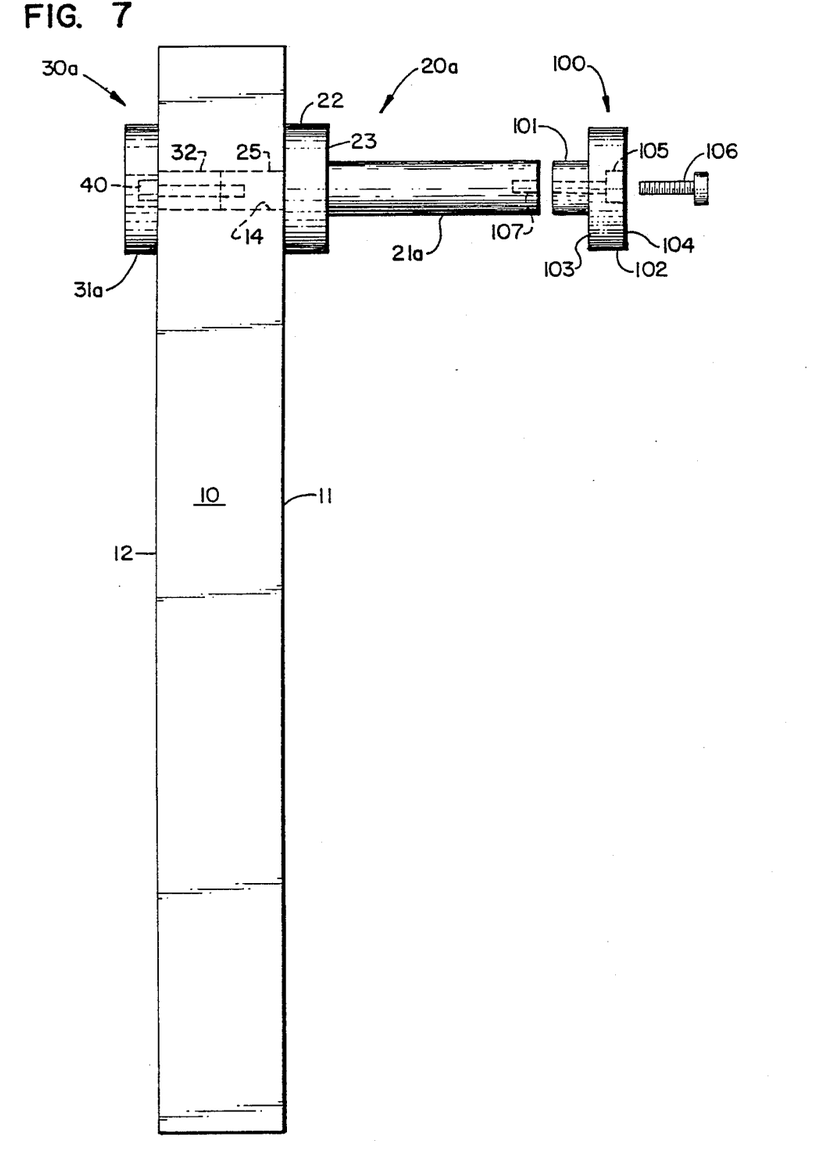
FIG. 7 is a view similar to FIG. 1 of an alternate embodiment of the invention.
Figure 8:
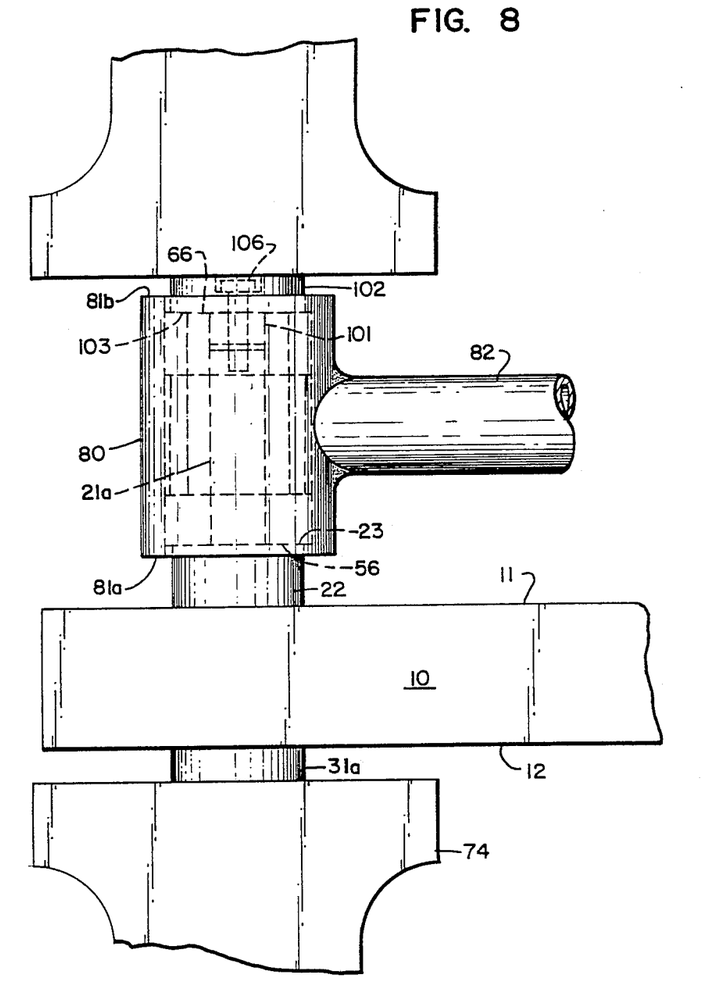
FIG. 8 is a view similar to FIG. 6 of the alternate embodiment.

Another preferred embodiment of the invention is shown in FIGS. 7 and 8. This embodiment is generally similar to the embodiment described above but is believed to be capable of higher accuracy, and is therefore to be preferred where the highest degree of precision is required. The improved embodiment as seen in FIGS. 7 and 8 is, in many respects, the same as the first described embodiment, and the same reference numbers are used to identify parts which are essentially the same in the two embodiments. The principal differences in the second embodiment lie in the shortening of pin 21a and the provision of engagement member 100, which fits in the sleeves of FIG. 4 on the opposite side of the bottom bracket shell from bar 10.

Engagement member 100 is made from one piece of material similar to member 20a (and number 20 of the first embodiment) and includes a turned pin-like portion 101 and a collar portion 102. Pin portion 101 has the same diameter as pin 21a, which in turn is the same as the diameter of pin 21 in the first embodiment, so that it can be received in bore 54 of the bottom bracket sleeve of FIG. 4. Collar portion 102 should have the same approximate diameter as collar 22, as it also will fit within the bottom bracket shell. The face 103 of collar 102 is machined to be precisely perpendicular to the axis of pin section 101, and forms an engagement surface for the sleeve. The outer surface 104 is also machined to be perpendicular to the central axis.

Pin 21a is shortened somewhat compared with pin 21 of the first embodiment, so as to allow for the length of pin section 101 when both are assembled into the central bore 54 of the bottom bracket sleeve of FIG. 4. Although not necessary, a bore 105 can be provided in member 100 to receive a bolt 106 with the head of the bolt being received in a recess so that it does not protrude above surface 104, and a tapped bore 107 can be provided in the end of pin 21a to receive the threading of bolt 106. The bolt is not necessary for the operation or accuracy of the invention, but does provide a certain convenience in operation, as described below.

The remainder of member 20a and member 30a can be identical to members 20 and 30 of the embodiment of FIG. 1. However, in the embodiment shown in FIG. 7, these members are simplified somewhat by a reduction in their diameter and eliminating bolts 42 and 44. Specifically, collar-like portion 24 has been eliminated and collar 22 extends further down to contact surface 11 of bar 10, and the diameter of collar 31a has been reduced accordingly.

The use of the improved embodiment is shown in FIG. 8. The bottom bracket sleeves 50 and 60 of FIG. 4 have been threaded securely into the bottom bracket shell of the bicycle as in the previous embodiment, and pin 21a has been inserted into the central bore 54 of sleeve 50 so that the engagement surface 23 contacts engagement surface 56. Engagement member 100 has been positioned on the opposite side of the bottom bracket shell with its pin 101 also in bore 54 and its engagement surface 103 in contact with engagement surface 66. Bolt 106 has been threaded into bore 107. Note that the ends of pins 101 and 21a do not touch, as it is desired that the parts fit together through solid engagement of surfaces 103, 66 on the one side and surfaces 23, 56 on the other side. Of course, when the gauge bar is assembled to the opposite side of the bicycle for further checking, the situation will be reversed with surface 23 engaging surface 66, and surface 103 engaging surface 56.

In FIG. 8, the jaws of the vise 72, 74 have been brought into engagement with the outside surfaces of engagement member 100 and member 31a, which define clamping surfaces to hold the bicycle and alignment tool together. Bolt 106 is not required for the design or use of the invention, but is convenient in that it holds the parts of the tool together in the bottom bracket before the assembly is in the vise, leaving hands free for positioning the bicycle and operating the vise.

With the bicycle held as shown in FIG. 8, the alignment of the down tube 82 and seat tube 84 can be measured with respect to the central movement of the bicycle frame, as in the previously described embodiment. The advantage of the embodiment of FIGS. 7 and 8 is that the jaws of the vise do not contact the bottom bracket shell at all on either side. It has been found that in extreme cases, the contact of the vise jaw on the face of the bottom bracket shell, for example face 81b of FIG. 6, can cause a certain amount of distortion within the bottom bracket shell, leading to slight inaccuracies and discrepancies in measurements along the seat tube or down tube taken on opposite sides thereof. These discrepancies, which are believed to be due to unevenness in the face of the vise jaw or lack of precision in the face of the bottom bracket shell, are avoided in the embodiment of FIGS. 7 and 8 since the clamping pressure is applied to the precision engagement surfaces of the tool without contacting the faces of the bottom bracket shell at all.

Since in the embodiment of FIGS. 7 and 8 the bicycle frame is not contacted by the vise at all, the frame will pivot about pins 21a, 101. This pivoting makes it easier to reposition for checking the seat tube or down tube. As a convenience a U-shaped clip 110 as indicated in FIG. 5 can be provided to hold the frame against pivoting. In this case the thickness of bar 10 should preferably be the same as the width of standard bicycle frame tubing. The gap of clip 110 can be approximately the same dimension so that it can be slipped over bar 10 and the bicycle frame tube when desired to hold it against pivoting.

While the preferred embodiments of the invention have been described above, it will be appreciated that numerous changes and variations can be made within the scope of the invention. For example, since accuracy of the tool is largely dependent on the engagement surfaces on the sleeve and attached to the bar, pin 21 and bore 54 serve largely to connect or assemble the parts, and other types of connecting means can be used for this purpose. Also, it would be possible to reverse the situation, with a pin member projecting from the sleeve and a bore formed in the bar.

The embodiments shown are for checking down tube and seat tube alignment of a frame. In another modified embodiment, the invention can be used for checking deviation of the chainstays and/or rear fork ends from the plane of the frame. In this case, the tool would be re-dimensioned, for example, by lengthening collar 22 and/or 24, to space bar 10 further from the frame so as to clear the chainstays and rear fork ends.

The invention as described above thus provides an economical and simple to use but highly accurate tool for the measurement of frame alignment.

What is claimed is:

1. A tool for checking alignment of bicycle frames of the type having a threaded bottom bracket shell for receiving the bicycle central movement, comprising:
   threaded sleeve means adapted for threading into the bottom bracket shell, said sleeve means having at least one outer face with a first engagement surface perpendicular to the axis of threading thereof;
   an elongate gauge member having at least one reference surface, and having means defining a second engagement surface;
   said gauge member and sleeve means having connecting means for permitting assembly of said gauge member and sleeve means in use with said sleeve means inserted in a bottom bracket shell and said gauge member positioned alongside the bicycle frame and with said first and second engagement surfaces abutting one another to position said reference surface perpendicular to the threading axis of the bottom bracket shell, whereby deviation of a tube of the frame from a plane perpendicular to the central movement can be measured.

2. Apparatus according to claim 1 wherein said sleeve means has another engagement surface and connecting means on the opposite side from said first engagement surface, whereby said gauge member can be assembled to the sleeve means on either side thereof to permit checking of alignment from either side of the bicycle frame.

3. Apparatus according to claim 1 wherein said connecting means comprises a projecting member and means defining a complementary recess for receiving said projecting member.

4. Apparatus according to claim 1 wherein said elongate gauge member includes means defining a clamping surface on the opposite side of said gauge member from said second engagement surface, to facilitate clamping said gauge member into contact with said sleeve means.

5. Apparatus according to claim 1 wherein said connecting means is configured to allow rotation of the gauge member to positions adjacent the down tube or seat tube of the bicycle frame for checking perpendicularity of each to the central movement of the frame.

6. Apparatus according to claim 1 wherein said threaded sleeve means comprises a pair of sleeves adapted for threading into opposite sides of the bottom bracket shell with one of the sleeve members being received inside the other.

7. A tool for checking alignment of bicycle frames of the type having a threaded bottom bracket shell for receiving the bicycle central movement, comprising:
   a pair of sleeve members adapted for threading into opposite sides of the bottom bracket shell and for engagement with one another along abutment surfaces thereof when tightened in place, said abutment surfaces being perpendicular to the axis of threading thereof, said sleeves having outer faces defining first engagement surfaces perpendicular to the axis of threading thereof;
   an elongate gauge member having a reference surface therealong, and having means adjacent an end thereof for defining a second engagement surface parallel to said reference surface;
   said gauge member having a projecting pin adjacent said second engagement surface, and said sleeve members having a complementary recess adjacent said first engagement surfaces for receiving said pin, for permitting said gauge member to be assembled to said sleeve members when inserted in a bottom bracket shell with said second engagement surface abutting one of said first engagement surfaces to position said gauge member alongside the down tube or seat tube of the bicycle frame with said reference surface held perpendicular to the threading axis of the bottom bracket shell, whereby deviation of the frame from a plane perpendicular to the central movement can be measured.

8. A tool for checking alignment of bicycle frames of the type having a threaded bottom bracket shell for receiving the bicycle central movement, comprising:
   a pair of sleeve members adapted for threading into opposite sides of the bottom bracket shell and for engagement with one another when tightened in place within said shell, said sleeve members each having outer faces defining first engagement surfaces which are perpendicular to the axis of threading thereof;
   an elongate gauge member for defining an alignment reference when positioned alongside a tube of the bicycle frame, and having means adjacent an end thereof for defining a second engagement surface parallel to said alignment reference;
   said gauge member having a projecting pin adjacent said second engagement surface, and said sleeve members when assembled in a bottom bracket shell having complementary recesses adjacent their first engagement surfaces for said pin, for permitting said gauge member to be assembled to one of said sleeve members with said second engagement surface abutting the first engagement surface of said sleeve member; and
   an engagement member having a projecting pin and having means adjacent said pin for defining a third engagement surface perpendicular thereto, for permitting said engagement member to be assembled to the other sleeve member on the opposite side of the bottom bracket shell from said gauge member with said third engagement surface abutting the first engagement surface thereof, whereby said gauge member and said engagement member can be clamped or held against the sleeve members to position the gauge member perpendicular to the threading axis of the bottom bracket shell so that deviation of a tube of the frame from a plane perpendicular to the central movement can be measured.

9. A tool according to claim 8 further including fastening means for fastening said engagement member to the pin of said gauge member when assembled in said sleeve members.

10. Apparatus according to claim 4 wherein said sleeve means has an additional engagement surface on the opposite side from said first-mentioned engagement surface and further including an engagement member for placing on the opposite side of said bottom bracket shell from said gauge member in contact with said additional engagement surface of said sleeve means and having a clamping surface whereby the bicycle frame and tool can be held in place for checking alignment by a vise or the like holding said clamping surfaces.

* * * * *